| (12) | United States Patent | (10) Patent No.: | US 7,665,567 B2 |
|---|---|---|---|
| | Kosugi | (45) Date of Patent: | Feb. 23, 2010 |

(54) SHIFT ACTUATOR, VEHICLE, AND METHOD OF INTEGRATING VEHICLE

(75) Inventor: Makoto Kosugi, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 509 days.

(21) Appl. No.: 11/469,252

(22) Filed: Aug. 31, 2006

(65) Prior Publication Data

US 2007/0251747 A1    Nov. 1, 2007

(30) Foreign Application Priority Data

Apr. 18, 2006    (JP)    ............................ 2006-114707

(51) Int. Cl.
*B60K 17/00*    (2006.01)
(52) U.S. Cl. .................................................... 180/344
(58) Field of Classification Search ................ 180/344, 180/230, 337
See application file for complete search history.

(56) References Cited

U.S. PATENT DOCUMENTS

| 1,500,878 | A | | 7/1924 | Kruchten |
| 1,990,209 | A | * | 2/1935 | Schoenrock ................. 180/344 |
| 2,617,505 | A | * | 11/1952 | Tatge ......................... 192/3.61 |
| 4,497,222 | A | | 2/1985 | Nagaoka et al. |
| 5,121,649 | A | * | 6/1992 | Randriazanamparany et al. ........................... 74/335 |
| 5,521,478 | A | * | 5/1996 | Bernreuther et al. ......... 318/592 |
| 6,257,081 | B1 | | 7/2001 | Gagnon et al. |
| H2031 | H | | 6/2002 | Harrell et al. |
| 6,481,554 | B1 | | 11/2002 | Ota et al. |
| 6,502,681 | B1 | | 1/2003 | Ota et al. |
| 6,524,224 | B2 | | 2/2003 | Gagnon et al. |
| 6,564,663 | B2 | | 5/2003 | Rioux et al. |
| 6,862,946 | B2 | * | 3/2005 | Sumita et al. ............. 74/421 A |
| 6,931,839 | B2 | | 8/2005 | Foster |
| 7,096,753 | B2 | * | 8/2006 | Kawakubo et al. .......... 74/337.5 |
| 7,225,705 | B2 | * | 6/2007 | Takano ....................... 74/606 R |
| 2004/0118652 | A1 | | 6/2004 | Muetzal et al. |

(Continued)

FOREIGN PATENT DOCUMENTS

DE    4336445    4/1995

(Continued)

OTHER PUBLICATIONS

European Search Report; Feb. 5, 2007, 5 pages.

(Continued)

*Primary Examiner*—Paul N. Dickson
*Assistant Examiner*—Timothy Wilhelm
(74) *Attorney, Agent, or Firm*—Knobbe, Martens, Olson & Bear, LLP

(57) ABSTRACT

A shift actuator comprises a drive shaft and a housing that rotatably supports the drive shaft. A shift position detecting apparatus detects a rotational position of the drive shaft. The drive shaft is connected to a shift mechanism by an operating lever and a shift rod. The operating lever and the housing are respectively formed with a through hole and a bottomed hole. The drive shaft can be temporarily secured in rotational position by inserting a lever positioning pin into the through hole and the bottomed hole. When secured, the shift position detecting apparatus can be attached to the housing and a length of the shift rod can be adjusted.

10 Claims, 10 Drawing Sheets

U.S. PATENT DOCUMENTS

| | | | |
|---|---|---|---|
| 2006/0065794 A1* | 3/2006 | Kunkel et al. | 248/121 |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1* | 7/2006 | Zenno et al. | 477/114 |
| 2006/0169561 A1 | 8/2006 | Ooishi et al. | |
| 2006/0169562 A1 | 8/2006 | Kosugi | |
| 2006/0169569 A1 | 8/2006 | Ooishi et al. | |
| 2007/0281824 A1* | 12/2007 | Tezuka et al. | 475/331 |

FOREIGN PATENT DOCUMENTS

| | | |
|---|---|---|
| DE | 19709419 | 3/1996 |
| DE | 19853333 | 6/1999 |
| DE | 10107962 | 8/2002 |
| DE | 10327438 | 1/2004 |
| DE | 10304588 | 4/2004 |
| DE | 10253809 A1 | 5/2004 |
| DE | 10306934 | 9/2004 |
| DE | 10393681 | 10/2005 |
| EP | 0129417 | 6/1984 |
| EP | 0328362 | 8/1989 |
| EP | 0590240 | 4/1994 |
| EP | 0635391 | 7/1994 |
| EP | 0887220 | 12/1998 |
| EP | 0987467 | 7/1999 |
| EP | 1122116 | 1/2001 |
| EP | 1365176 | 7/2002 |
| EP | 1342930 | 9/2003 |
| EP | 1469236 A | 10/2004 |
| EP | 1555461 | 7/2005 |
| EP | 1666772 A | 6/2006 |
| FR | 0490730 A1 | 12/1991 |
| GB | 2170571 | 8/1986 |
| JP | 4311555 | 5/1943 |
| JP | 58152938 | 9/1983 |
| JP | 6086631 | 6/1985 |
| JP | 61024858 | 2/1986 |
| JP | 62017631 | 1/1987 |
| JP | 6280192 | 4/1987 |
| JP | 6275414 | 5/1987 |
| JP | 62110532 | 5/1987 |
| JP | 3172675 | 7/1991 |
| JP | 3290030 | 12/1991 |
| JP | 04266619 | 9/1992 |
| JP | 5026065 | 2/1993 |
| JP | 5039865 | 2/1993 |
| JP | 8061487 | 3/1996 |
| JP | 11082710 | 3/1999 |
| JP | 3044498 | 3/2000 |
| JP | 2000205411 | 7/2000 |
| JP | 2001050389 | 2/2001 |
| JP | 2001146930 | 5/2001 |
| JP | 2001173685 | 6/2001 |
| JP | 2001280493 | 10/2001 |
| JP | 2002067741 | 3/2002 |
| JP | 2002243034 | 8/2002 |
| JP | 2003329064 | 11/2003 |
| JP | 2005282784 | 10/2005 |
| JP | 2006017221 | 1/2006 |
| JP | 02118269 | 8/2006 |
| WO | 9110979 A | 7/1991 |
| WO | WO 98/24008 | 6/1998 |
| WO | WO 02/25131 | 3/2002 |
| WO | WO 2004/005743 | 1/2004 |
| WO | WO 2004/094177 | 4/2004 |

OTHER PUBLICATIONS

Co-Pending U.S. Appl. No. 11/514,387, filed Aug. 31, 2006. Title: Clutch Failure Detector, Automatic Clutch System, and Straddle-Type Vehicle.

Co-Pending U.S. Appl. No. 11/514,386, filed Aug. 31, 2006. Title: Clutch Control Device and Vehicle.

Co-Pending U.S. Appl. No. 11/514,000, filed Aug. 31, 2006. Title: Automatic Shift Control Device and Vehicle.

Co-Pending U.S. Appl. No. 11/513,609, filed Aug. 31, 2006. Title: Automated Transmission Controller and Vehicle Including the Automated Transmission Controller.

Co-Pending U.S. Appl. No. 11/514,017, filed Aug. 31, 2006. Title: Automated Transmission Controller and Vehicle Including the Automated Transmission Controller.

Co-Pending U.S. Appl. No. 11/513,537, filed Aug. 31, 2006. Title: Automatic Gearshift Control Device and Vehicle.

Co-Pending U.S. Appl. No. 11/469,268, filed Aug. 31, 2006. Title: Clutch Actuator, Engine Unit, and Straddle Type Vehicle.

Co-Pending U.S. Appl. No. 11/469,310, filed Aug. 31, 2006. Title: Clutch Actuator, Engine Unit, and Straddle Type Vehicle.

Co-Pending U.S. Appl. No. 11/469,228, filed Aug. 31, 2006. Title: Clutch Actuator, Engine Unit, and Straddle Type Vehicle.

Co-Pending U.S. Appl. No. 10/591,285, filed Aug. 31, 2006. Title: Riding Type Vehicle.

Co-Pending U.S. Appl. No. 10/591,560, filed Aug. 31, 2006. Title: Speed Change Controller for Straddle-Ride Type Vehicles.

Co-Pending U.S. Appl. No. 10/591,559, filed Aug. 31, 2006. Title: Shift Control Device for Straddle-Type Vehicle, and Straddle-Type Vehicle.

Co-Pending U.S. Appl. No. 10/591,284, filed Aug. 31, 2006. Title: Actuation Force Transmission Mechanism and Straddle-Type Vehicle.

* cited by examiner

SHIFT ACTUATOR, VEHICLE, AND METHOD OF INTEGRATING VEHICLE

CROSS-REFERENCE TO RELATED APPLICATIONS

This application claims the priority benefit of Japanese Patent Application No. 2006-114707, filed Apr. 18, 2006, which is hereby incorporated by reference in its entirety.

BACKGROUND OF THE INVENTION

1. Field of the Invention

The present application generally relates to a shift actuator, a vehicle, and a method of assembling a vehicle.

2. Description of the Related Art

A motorcycle is popular type of vehicle. Motorcycles typically comprise an engine and a transmission. The transmission alters a rotational speed of a crankshaft of the engine while transmitting power from the crankshaft to a drive wheel. The transmission can comprise a shift mechanism, a main shaft, a drive shaft and a plurality of speed change gear combinations. A clutch mechanism can be positioned between the engine and the transmission such that rotation of the transmission can be stopped while the gear combination is changed.

At least one motorcycle has implemented an automated manual transmission mechanism (AMT mechanism) that automates the gear combination shifting operation. Such a transmission is described in JP-A-2006-017221. The AMT mechanism includes a shift actuator that drives a shift mechanism and a shift-power transmitting mechanism that connects the shift actuator and the shift mechanism. The shift-power transmitting mechanism transmits forces from the shift actuator to the shift mechanism.

The shift actuator includes a motor, which acts as a drive source. The shift actuator also includes a shift potentiometer. The shift potentiometer detects a rotational angle of the motor. The shift actuator determines the speed change position of the shift mechanism based the output of the shift potentiometer.

The shift mechanism is capable of rotating in a forward direction and a reverse direction from a reference position (i.e., a neutral position). Rotation of the shift mechanism from the reference position effects a change in the selected gear combination. Thus, during assembly of the motorcycle, the shift actuator is calibrated to match the reference position during production at a factory, during maintenance or the like. For instance, the shift power transmitting mechanism is adjusted such that it is in the reference position when the output of the shift potentiometer is a predetermined voltage value.

Calibration of the shift actuator by adjusting the position of the shift power transmitting mechanism is a manual operation that requires the individual performing the calibration to repeatedly confirm the output voltage value of the potentiometer. Calibration therefore is complicated, assembly of the motorcycle is difficult and maintenance of the assembled vehicle is tedious.

Accordingly, one aspect of the present invention relates to simplifying the assembly of the vehicle through improvements in the shift actuator and related vehicle components.

SUMMARY OF THE INVENTION

Upon a review of the early AMT mechanism, two factors have been identified that complicate adjustment of the reference position of the shift mechanism. One factor is that portions to be adjusted are present in two different locations (i.e., the position sensor and the shift power transmitting mechanism). Another factor is that both of the two adjustable portions are directly or indirectly connected to the drive shaft. As a result of intensive investigation of how to simplify calibration of the shift actuator, it has been found that when the drive shaft is temporarily secured against substantial rotation relative to a housing, adjustment of the two portions can be performed easily and independently.

Thus, one aspect of the present invention involves a method of assembling a vehicle. The vehicle comprises a shift mechanism. The shift mechanism comprises a plurality of gear combinations. A shift actuator comprises a drive shaft, a housing for rotatably supporting the drive shaft, and a position sensor supported by the housing with the position sensor being adapted to detect a rotational position of the drive shaft. The shift mechanism further comprises a shift power transmitting mechanism. The shift power transmitting mechanism is adapted to connect the shift mechanism and the shift actuator with at least a portion of the shift power transmitting mechanism having an adjustable length. The method of assembling comprises fixing the drive shaft to the housing such that the drive shaft is generally unable to rotate relative to the housing, attaching the position sensor to the housing while the drive shaft is unable to rotate relative to the housing and adjusting the adjustable length of the portion of the shift power transmitting mechanism while the drive shaft is unable to rotate relative to the housing.

In some arrangements, the length is adjusted before the position sensor is attached to the housing. In other arrangements, the length is adjusted after the position sensor is attached to the housing.

Another aspect of the present invention involves a vehicle comprising a shift mechanism comprising a plurality of speed change gear stages. The vehicle also comprises a shift actuator comprising a drive shaft, a housing rotatably supporting the drive shaft, and a position sensor supported by the housing. The position sensor is adapted to detect a rotational position of the drive shaft. The vehicle also comprises a shift power transmitting mechanism that connects the shift mechanism and the shift actuator. A portion of the shift power transmitting mechanism has an adjustable length. The housing comprises a first support portion that supports a fixing member. The fixing member is removably secured to the drive shaft such that the drive shaft is secured by the fixing member to the housing and such that the drive shaft is generally unable to rotate relative to the housing with the fixing member secured to the drive shaft.

A further aspect of the present invention involves a shift actuator comprising a drive shaft, a housing rotatably supporting the drive shaft, and a position sensor supported by the housing. The position sensor is adapted to detect a rotational position of the drive shaft. The housing comprises a first support portion. The first support portion is adapted to temporarily secure a fixing member. The fixing member secures the drive shaft to the housing such that the drive shaft is generally unable to rotate relative to the housing.

In one configuration, the position sensor can be attached to the housing with the drive shaft temporarily locked and, therefore, a position of the position sensor can easily be adjusted. Further, separately from the shift power transmitting mechanism, the position of the position sensor can be adjusted by a single member of the shift actuator. Therefore, ease of assembly can be improved. Further, the length of the shift power transmitting mechanism can be adjusted with the drive shaft temporarily locked in position and, therefore, in comparison with the background art of adjusting the length while looking at the output value of the sensor, adjustment of the preferred configuration is simplified. In addition, the length of the shift power transmitting mechanism can be adjusted independently from adjustment of the position of the position sensor and, therefore, both ease of assembly and ease of maintenance are improved.

BRIEF DESCRIPTION OF THE DRAWINGS

These and other features, aspects and advantages will now be described with reference to drawings of a preferred embodiment. The drawings comprise the following figures.

DETAILED DESCRIPTION OF THE PREFERRED EMBODIMENT

Figure 1:
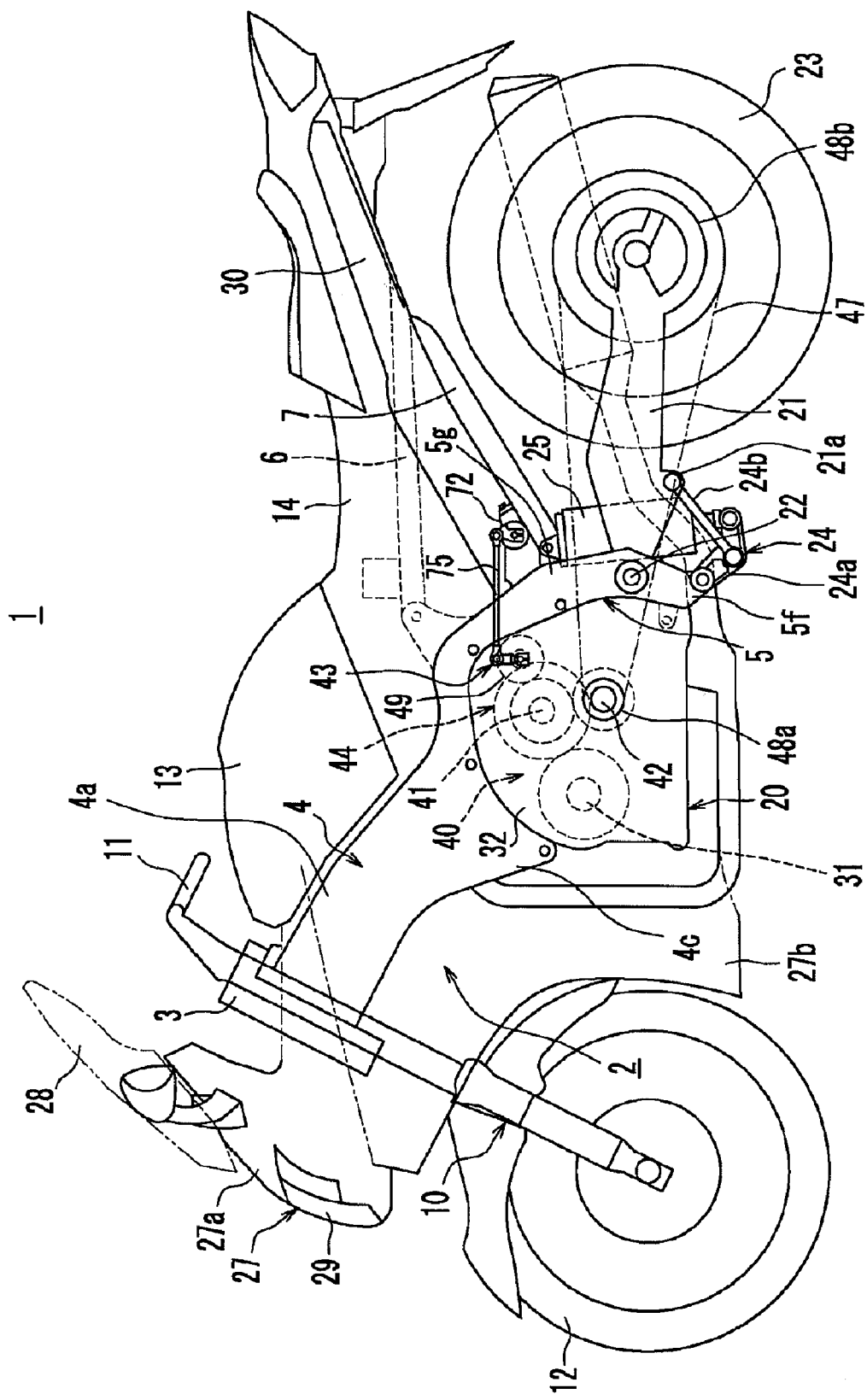
FIG. 1 is a side view of a motorcycle that is arranged and configured in accordance with certain features, aspects and advantages of an embodiment of the invention.

FIG. 1 is a side view showing a motorcycle 1 that is arranged and configured in accordance with certain features, aspects and advantages of an embodiment of the invention. As shown by FIG. 1, the motorcycle 1 comprises a head pipe 3 and a vehicle body frame 2. The vehicle body frame 2 comprises a main frame 4 that extends rearward from the head pipe 3. The vehicle body frame 2 also comprises a rear arm bracket 5 that extends generally downward from a rear portion of the main frame 4. The main frame 4 comprises a left frame portion 4a and a right frame portion 4a (only the left frame portion 4a is shown in FIG. 1). The frame portions 4a extend rearward from the head pipe 3. The rear portions of the frame portions 4a extend downward and connect to the rear arm bracket 5.

A front fork 10 is supported by the head pipe 3. An upper end of the front fork 10 is connected to a steering handle 11 while a lower end of the front fork 10 is supported by a front wheel 12. A fuel tank 13 can be arranged near an upper portion of the main frame 4, and a seat 14 can be positioned rearward of the fuel tank 13. In one configuration, the seat 14 is mounted on a seat rail 6.

In a preferred configuration, an engine 20 is suspended by the main frame 4 and the rear arm bracket 5. In particular, the engine 20 can be supported by an engine attaching portion 4c of the main frame 4 and the frame portion 4a of the main frame 4. The engine also can be supported by an engine attaching portion (not illustrated) of the rear arm bracket 5.

The engine 20 can have any suitable construction. The engine 20 is not limited to an internal combustion engine (e.g., gasoline engine, diesel engine or the like). In some configurations, the engine 20 can be an electric motor or the like. Furthermore, in some configurations, a hybrid engine construction can be used.

A forward portion of a rear arm 21 can be pivotally connected to the rear arm bracket 5 by a pivot shaft 22. The rear arm 21, therefore, preferably pivots in an up and down direction. A rear wheel 23 can be supported by a rearward portion of the rear arm 21.

In one configuration, a link mechanism 24 and a rear cushion unit 25 can be used to connect a portion of the rear arm 21 to the vehicle body frame 2. The link mechanism 24 generally comprises a vehicle body side link 24a and a rear arm side link 24b. One end of the vehicle body side link 24a is pivotally connected to a link attaching portion 5f of the rear arm bracket 5. One end of the rear arm side link 24b is pivotally connected to a link attaching portion 21a of the rear arm 21. Further, a central portion of the vehicle body side link 24a and an end portion of the rear arm side link 24b are pivotally connected. A lower portion of the rear cushion unit 25 is supported by an end portion of the vehicle body side link 24a and an upper portion of the rear cushion unit 25 is supported by a cushion attaching portion 5g. The rear cushion unit 25 preferably is arranged rearward of the rear arm bracket 5.

The vehicle body frame 2 can support a cowling 27. The cowling 27 comprises an upper cowling 27a that covers a front side of the steering handle 11. The cowling 27 also comprises a lower cowling 27b that covers the left and right sides of the main frame 4 and the left and right lower sides of the engine 20. The upper cowling 27a can be supported by the vehicle body frame 2 with a stay (not illustrated). In one configuration, the upper cowling 27a forms a front face of a front portion and side faces in the left and right direction of the vehicle body. The upper cowling 27a also can be connected to, or provided with, a screen 28 and a head lamp 29 or the like. The screen 28 preferably comprises a generally transparent member. The screen 28 and the head lamp 29 preferably are positioned at an upper portion of a forward side of the vehicle body. A side cover 30 can be connected to a back stay 7. The side cover 30 can cover left and right sides of the seat 14 and an upper portion of the rear wheel 23.

As mentioned above, the engine can have any suitable configuration. In one configuration, the engine 20 comprises a water-cooled, parallel 4 cylinder engine. The engine 20 preferably comprises an inclined construction such that a cylinder axis (not shown) inclines slightly forward from a generally horizontal plane. Preferably, a crankcase 32 that contains a crankshaft 31 is suspended and supported by the vehicle body frame 2 on both sides in a vehicle width direction. As mentioned, other constructions also can be used.

The illustrated engine 20 is coupled to a transmission 40. The illustrated transmission 40 comprises a main shaft 41, a drive shaft 42 and a shift mechanism 43. The main shaft 41 preferably extends generally parallel to the crankshaft 31 of the engine 20. The drive shaft 42 preferably extends generally parallel with the main shaft 41. The shift mechanism 43 preferably comprises a plurality of stages of speed change gears 49 and the shift mechanism preferably is integrated to the crankcase 32. A clutch mechanism 44 can be used to interrupt the power flow from the engine 20 to the transmission 40, such as when the transmission is changing between stages of the speed change gears 49.

The drive shaft 42 can be provided with a drive sprocket 48a. A driven sprocket 48b can be provided at the rear wheel 23. A chain 47 can be wrapped around a portion of the drive sprocket 48*a* and the driven sprocket 48*b*. Engine power can be transmitted to the rear wheel 23 from the transmission 40 by the chain 47.

Figure 2:
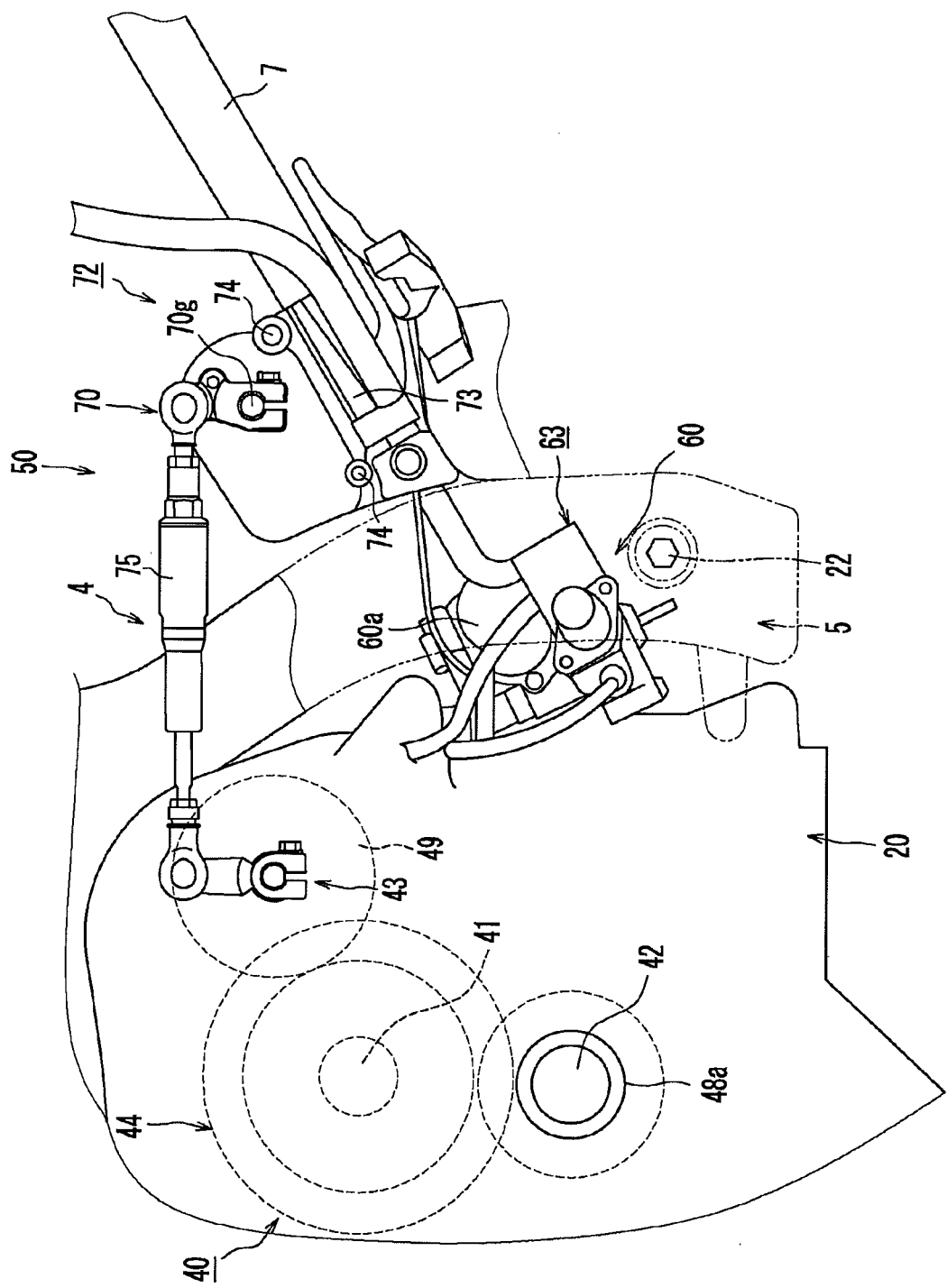
FIG. 2 is an enlarged side view of an automated transmission control device used on the motorcycle of FIG. 1.

The motorcycle 1 preferably comprises an automated transmission control apparatus 50. As shown by FIG. 2, the automated transmission control apparatus 50 automatically interrupts the clutch mechanism 44 and switches the speed change gears of the transmission apparatus 40. The automated transmission control apparatus 50 preferably comprises a clutch actuator 60 that drives the clutch mechanism 44, a shift actuator 70 that switches the speed change gears of the transmission apparatus 40, and an engine control apparatus 95 (see FIG. 8) that controls operation of the clutch actuator 60 and the shift actuator 70.

Figure 3:
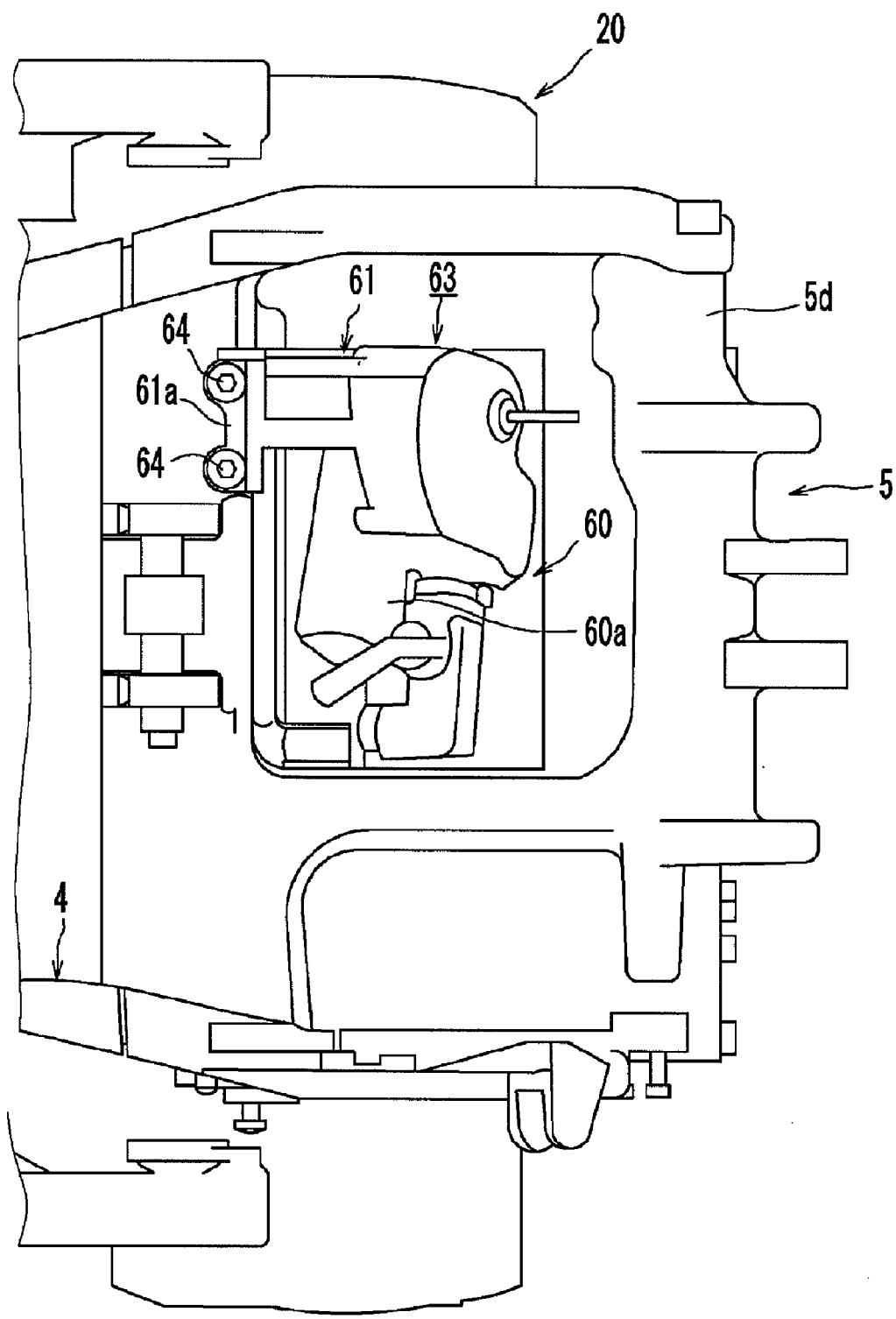
FIG. 3 is another view of the automated transmission control device shown in FIG. 2.
Figure 4:
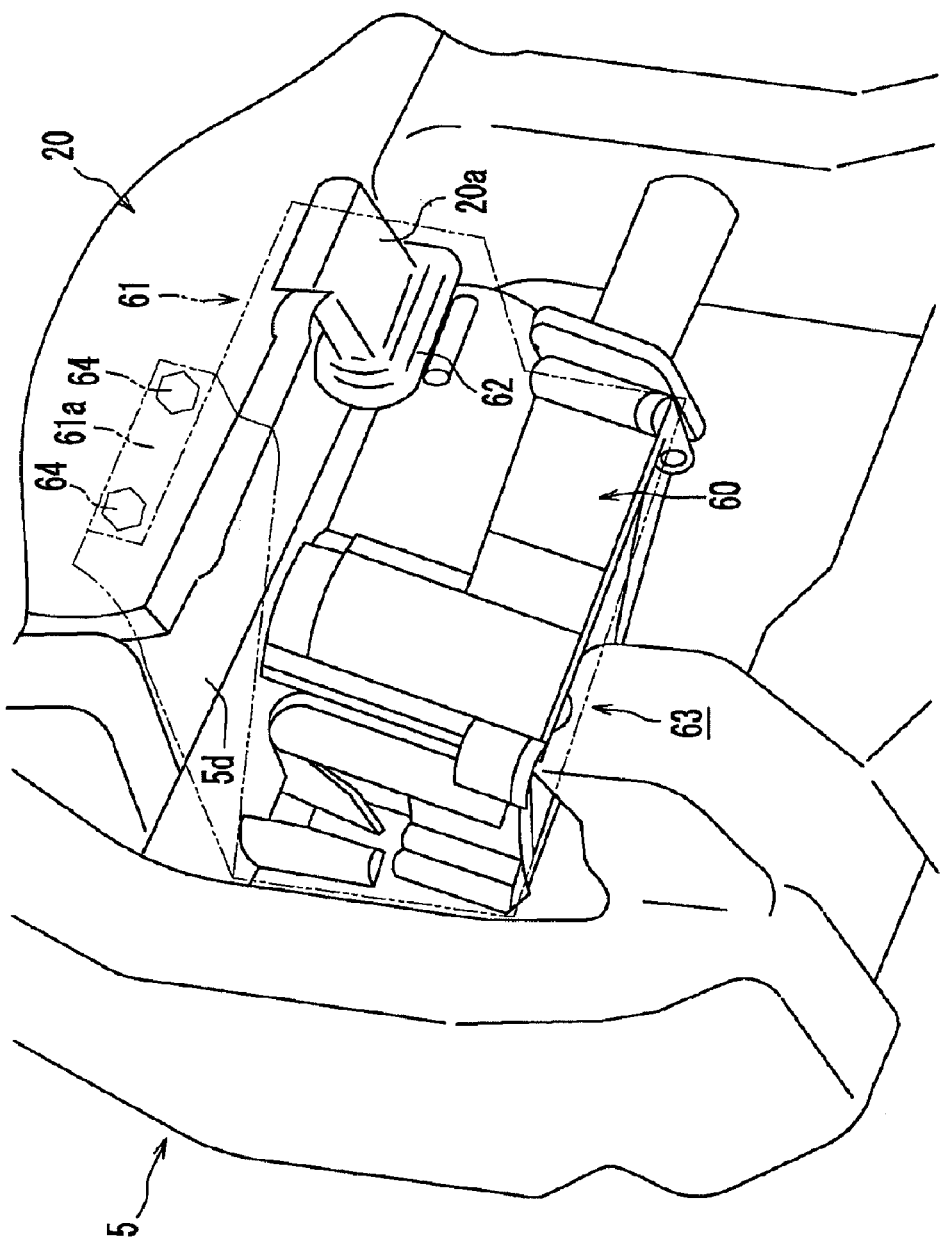
FIG. 4 is a perspective view of the automated transmission control device.
Figure 5:
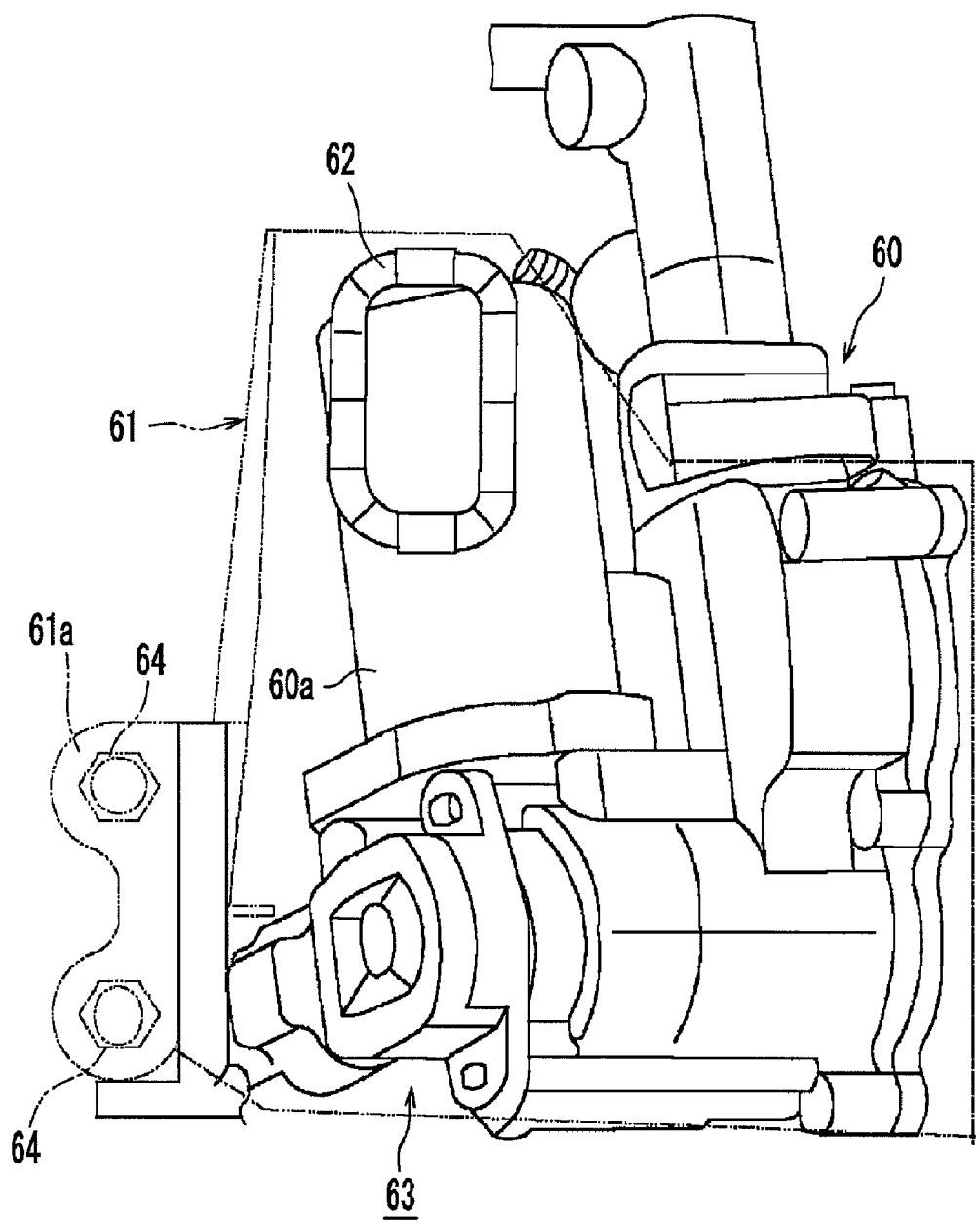
FIG. 5 is a further perspective view of the automated transmission control device.

With reference to FIG. 3, a clutch operating unit 63 comprises the clutch actuator 60 and can comprise various constituent elements that can be integrated to an attaching plate 61. The attaching plate 61 can be secured to an engaging hole portion 62 (see FIG. 4 and FIG. 5). As shown in FIG. 4, the clutch operating unit 63 can be attached by engaging the engaging hole portion 62 to a projected portion 20*a* that is secured to a rear portion of the engine 20. The clutch operating unit can be further secured by fastening an attaching portion 61*a* of the attaching plate 61 to a member portion 5*d* of the rear arm bracket 5. The attaching portion 61*a* and the attaching plate 61 can be secured with a fastener 64, such as a bolt or the like. In the illustrated configuration, the clutch operating unit 63 is generally surrounded, when viewed from the side of the vehicle, by the rear arm bracket 5 rearward of the engine 20 (see FIG. 1).

Figure 6:
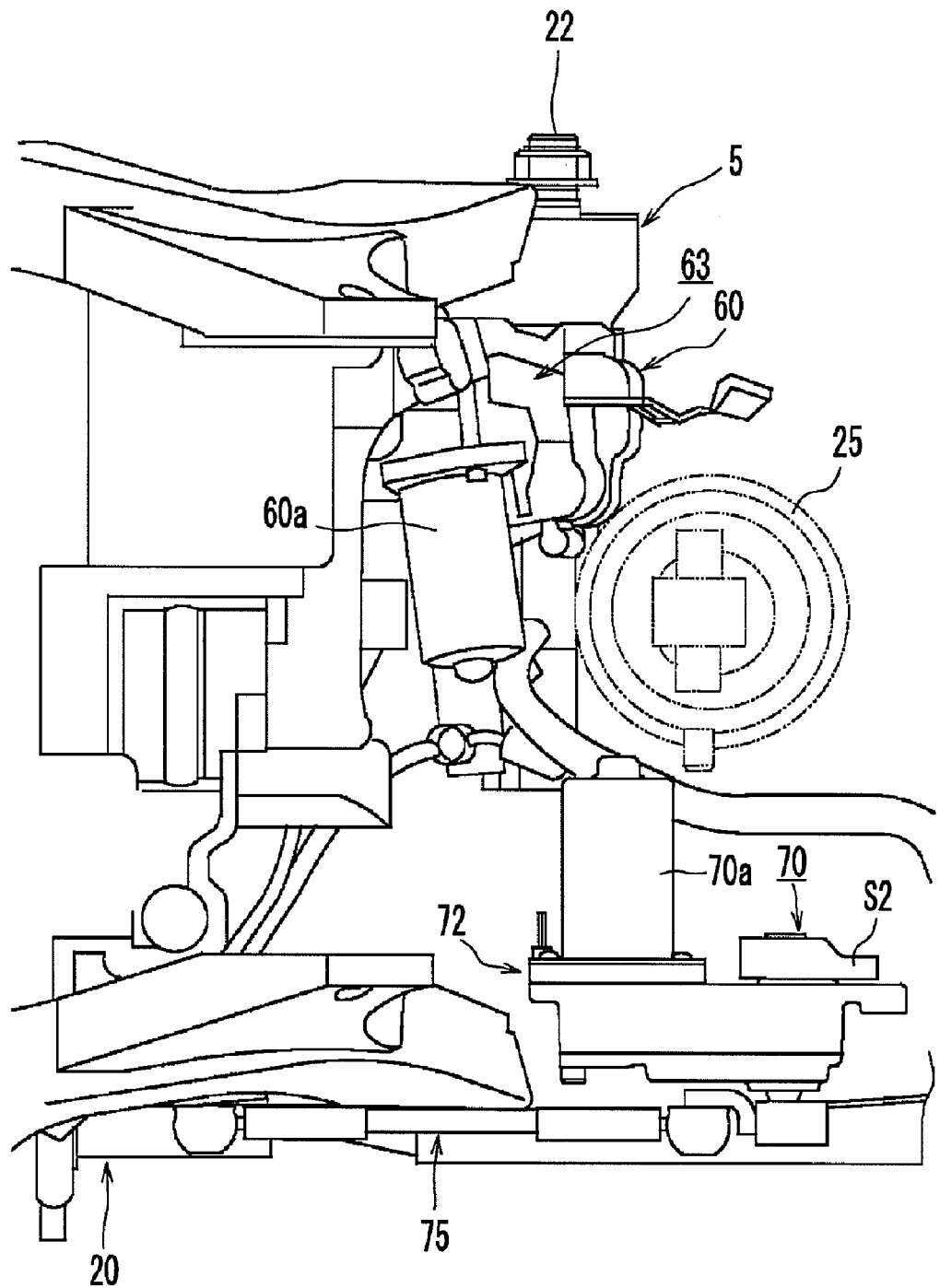
FIG. 6 is a top plant view of the automated transmission control device.

With reference to FIG. 2 and FIG. 6, the shift actuator 70 preferably is integrated with a shift position detecting apparatus S2 (see FIG. 6) to define a shift operating unit 72. As shown by FIG. 2, an attaching bracket 73 can be secured to the back stay 7. The shift operating unit 72, and in the illustrated configuration, the shift actuator 70 can be secured to the attaching bracket 73 by a fastener 74, such as a bolt or the like. In this way, the shift operating unit 72 is disposed to an opposite side of the transmission 40 relative to the main frame 4 (see FIG. 1) and the shift actuator 70 can be disposed rearward of the main frame 4 in a side view of the vehicle.

The shift mechanism 43 and the shift actuator 70 are connected by a shift power transmitting mechanism. In one preferred construction, the shift power transmitting mechanism comprises a shift rod 75. Other constructions also can be used.

Preferably, the shift rod 75 traverses the vehicle body frame 2 when the vehicle is viewed from the side.

Figure 7:
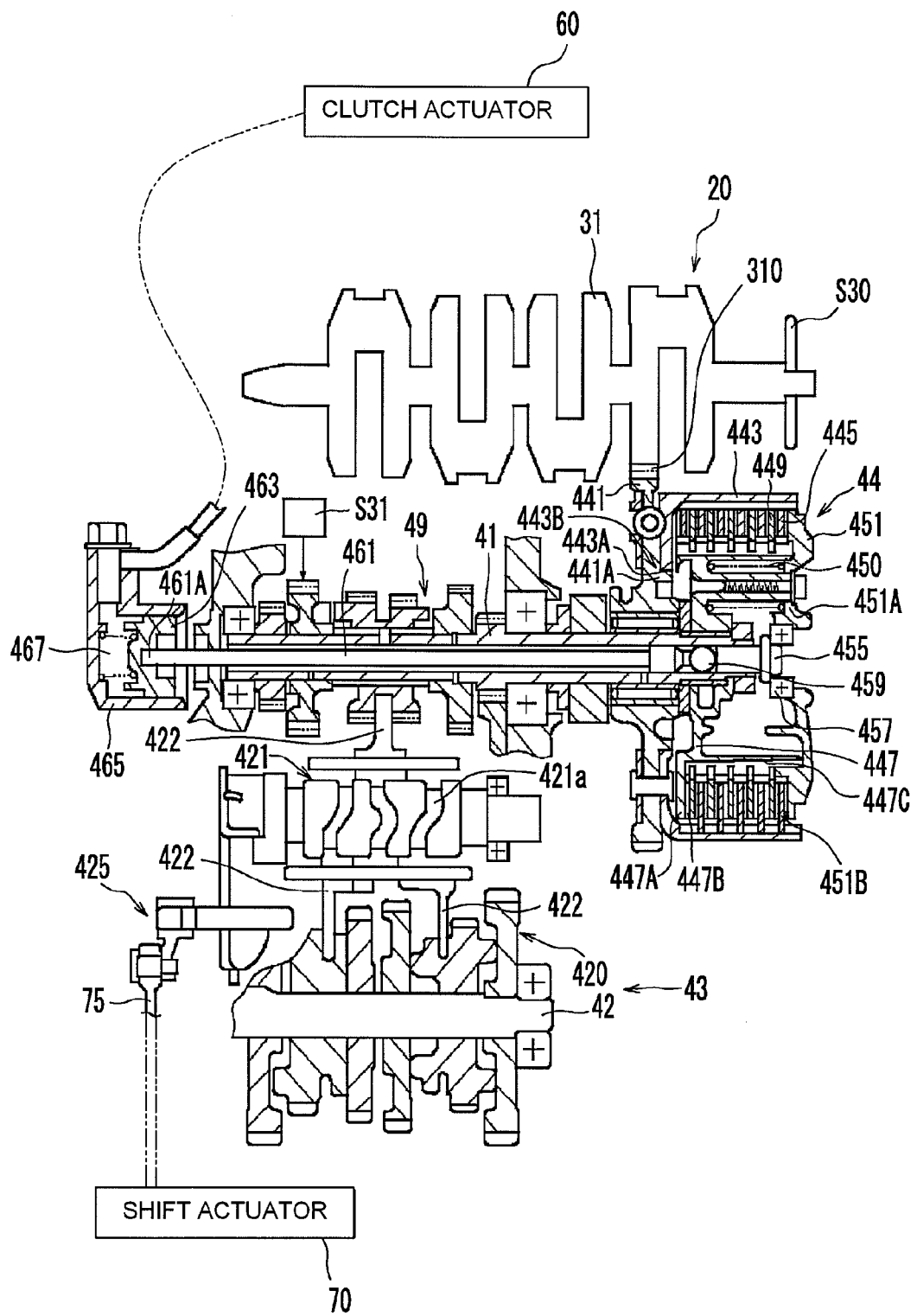
FIG. 7 is sectioned view of the internal structure of an engine unit and some portions of the automated transmission control device.

With reference now to FIG. 7, the clutch mechanism 44 will be explained in greater detail. FIG. 7 is a sectional view showing an inner portion of the engine 20. The clutch mechanism 44 can comprise, for example, a multiple disk friction clutch and can comprise a clutch housing 443, a plurality of friction plates 445 that are integrated with the clutch housing 443, a clutch boss 447, and a plurality of clutch plates 449 that are integrated with the clutch boss 447.

A crankshaft gear 310 of the engine 20 can be supported by the crankshaft 31 of the engine 20. A gear 441 can be rotatably mounted to the main shaft 41. The crankshaft gear 310 and the gear 441 can mesh. The clutch housing 443 preferably is connected for rotation with, and more preferably is integrated with, the gear 441. Thus, torque is transmitted from the crankshaft 31 to the clutch housing 443 by way of the gears 310, 441. The torque is transmitted from the clutch housing 443 to the clutch boss 447 by friction force generated among the plurality of friction plates 445 and the plurality of clutch plates 449.

The gear 441 is supported by the main shaft 41 at one end (i.e., the right side of FIG. 7) of the main shaft 41 and the gear 441 is capable of rotation relative to the main shaft 41 if the clutch is disengaged. The clutch housing 443 is rotatable relative to the main shaft 41 while being restricted from substantial axial movement along the main shaft 41. The boss portion of the gear 441 and the clutch boss 447, which is provided integrally with the main shaft 41 in the illustrated embodiment, act to restrict the axial movement in the illustrated configuration.

The clutch boss 447 can be provided on an inner side of the clutch housing 443. In one embodiment, the clutch boss 447 comprises a generally cylindrical shape. In a preferred embodiment, the gear 441, the clutch housing 443, the clutch boss 447 and the main shaft 41 have the same rotational center line. In other words, these members preferably are configured to be generally concentric with each other.

The boss portion of the gear 441 can comprise an engaging projected portion 441A. The projected portion 441A can have a generally cylindrical shape. One end (i.e., the left side of FIG. 7) of the clutch housing 443 comprises with an engaging portion 443B, which comprises an engaging hole 443A adapted to engage with the engaging projected portion 441A. By fitting the engaging projected portion 441A to the engaging hole 443A, the clutch housing 443 can be secured to the gear 441.

Each friction plate 445 preferably comprises a thin plate having a generally ring-like shape. An outer peripheral edge of each friction plate 445 can be supported by an inner wall of the generally cylindrical portion of the clutch housing 443 such that a plate face of each friction plate 445 is substantially orthogonal to the axial direction of the main shaft 41. In this manner, each friction plate 445 is slightly movable relative to the clutch housing 443 in the axial direction of the main shaft 41 while being generally restricted from rotation relative to the clutch housing 443. Further, the respective plate faces of the respective friction plates 445 are spaced apart from each other by a predetermined interval (a distance slightly larger than a thickness of the clutch plate 449).

The clutch boss 447 preferably comprises a generally cylindrical shape. One end portion (i.e., the left side of FIG. 7) of the illustrated clutch boss 447 comprises a flange portion 447A that has a generally circular shape and that has an outer diameter substantially equal to an outer diameter of the clutch plate 449. The plurality of clutch plates 449 are supported by an outer periphery of a generally cylindrical portion of the clutch boss 447. By supporting in this way, each clutch plate 449 is slightly movable relative to the boss 447 in the axial direction of the main shaft 41 while being generally restrained from rotation relative to the clutch boss 447. The clutch boss 447 can be fixed to one end portion (i.e., the right side of FIG. 7) of the main shaft 41 such that the flange portion 447A is disposed at an engaging portion 443B of the clutch housing 443.

Each clutch plate 449 comprises a thin plate in a generally ring-like shape. An inner peripheral edge of each clutch plate 449 can be supported by an outer surface of the generally cylindrical portion of the clutch boss 447 such that a plate face of each clutch plate 449 becomes substantially orthogonal to the axial direction of the main shaft 41. Further, the respective plate faces of the respective clutch plates 449 preferably are spaced apart from each other by a predetermined interval (e.g., a distance slightly larger than a thickness of the friction plate 445).

An outer diameter of each clutch plate 449 preferably is slightly smaller than an inner diameter of the cylindrical portion of the clutch housing 443, and an inner diameter of each friction plate 445 preferably is slightly larger than an outer diameter of the cylindrical portion of the clutch boss 447. Further, the friction plates 445 and the clutch plates 449 can be alternately arranged in the axial direction of the main shaft 41 with small gaps being formed between the friction plates 445 and the clutch plates 449 respectively in the axial direction of the main shaft 41.

A pressing portion 447B formed by the flange portion 447A of the clutch boss 447 is position outside in the axial direction of the main shaft 41 of the friction plates 445 and the clutch plates 449. In the illustrated configuration, the pressing portion 447B is positioned to the same side of the plates 445, 449 (i.e., the left side of FIG. 7) as the engaging portion 443B of the clutch housing 443. The pressing portion 447B and the pressure plate 451 generate friction forces between the respective friction plates 445 and the respective clutch plates 449 by squeezing the friction plates 445 and the clutch plates 449 in the axial direction of the main shaft 41.

An inner side of the generally cylindrical portion of the clutch boss 447 is arranged with a plurality of guide portions 447C that preferably have a generally cylindrical shape that extends in the axial direction of the main shaft 41 and that are formed generally integrally with the clutch boss 447. The pressure plate 451 is provided with a plurality of guide portions 451A engaged with respective guide portions 447C. The pressure plate 451 is capable of movement relative to the clutch boss 447 in the axial direction of the main shaft 41 while being coupled for rotation with the clutch boss 447 by the guide portions 447C and the guide portions 451A. The pressure plate 451 also can be driven by the clutch actuator 60. The clutch actuator 60 will be described in detail below.

The pressure plate 451 comprises a generally planar pressing portion 451B. The pressing portion 451B preferably is substantially parallel with the plate faces of the friction plates 445 and the clutch plates 449.

The clutch mechanism 44 is provided with a plurality of springs 450. The springs surround corresponding guide portions 447C. The guide portions 447C preferably comprise a generally cylindrical shape. The springs 450 urge the pressure plate 451 toward the left in FIG. 7. In other words, the springs 450 urge or bias the pressure plate 451 such that the pressing portion 451B of the pressure plate 451 nears the pressing portion 447B of the clutch boss 447.

The pressure plate 451 is engaged with one end (i.e., the right side of FIG. 7) of a push rod 455 through a bearing of a deep groove ball bearing 457 or the like, which is positioned at a center portion of the pressure plate 451 in the illustrated arrangement. The pressure plate 451 is rotatable relative to the push rod 455. The other end (i.e., the left side in FIG. 7) of the push rod 455 extends through the inside of the main shaft 41, which preferably defines a generally cylindrical lumen. An inside of the main shaft 41 can receive a generally spherical ball 459 that is positioned adjacent to the end (i.e., the left end in FIG. 7) of the push rod 455. Another push rod 461 preferably is positioned adjacent to an opposite side of the ball 459.

One end 461A (i.e., the left end in FIG. 7) of the push rod 461 projects from the other end of the main shaft 41. The end 461A preferably is generally cylindrical in shape. The end 461A can be connected to or integrated with a piston 463. The piston 463 can be guided by a cylinder main body 465 and can be axially moveable relative to the main shaft 41.

When a working fluid, which can be compressing fluid, is supplied to a space 467 defined by the piston 463 and the cylinder main body 465, the piston 463 is pushed to the right in FIG. 7. The piston 463 pushes the pressure plate 451 to the right in FIG. 7 through movement of the push rod 461, the ball 459, the push rod 455 and the deep groove ball bearing 457. Thus, when the pressure plate 451 is pushed to the right in FIG. 7, the pressing portion 451B of the pressure plate 451 is separated from the friction plate 445, and the clutch is disengaged.

When the clutch mechanism 44 is engaged, the pressure plate 451 is urged toward the flange portion 447A of the clutch boss 447 (i.e., the left direction in FIG. 7) by the spring 450. Preferably, the pressure plate 451 moves toward the flange portion 447A. The friction forces are generated between the respective friction plates 445 and the respective clutch plates 449 by the pressing portion 447B of the clutch boss 447 and the pressing portion 451B of the pressure plate 451. Thus, a drive force can be transmitted from the clutch housing 443 to the clutch boss 447.

On the other hand, when the clutch mechanism 44 is disengaged, the pressure plate 451 is moved to the right in FIG. 7 by the push rod 455. The pressing portion 451B of the pressure plate 451 is separated from the friction plate 445 that is most closely positioned relative to the pressing portion 451B. Hence, the friction plates 445 and the clutch plates 449 are not squeezed together and slight gaps are formed between the friction plates 445 and the clutch plates 449 and the friction forces capable of transmitting the drive force are not generated between the friction plates 445 and the clutch plates 449.

Thus, the pressure plate 451 is axially moved in one direction or the other relative to the main shaft 41 by the drive force of the clutch actuator 60, which acts against the biasing force of the spring 450. The axial movement switches the clutch between the engaged state and the disengaged state.

With reference still to FIG. 7, an engine speed sensor or engine rotational number sensor S30 preferably is mounted to an end of the crankshaft 31. The crankshaft 31 is connected to the main shaft 41 by the multiple plate type clutch mechanism 44. The main shaft 41 carries multiple stages of the speed change gears 49 and is provided with a main shaft speed sensor or a main shaft rotational number sensor S31. The speed change gears 49 on the main shaft 41 mesh with speed change gears 420 mounted on the drive shaft 42 (note that the gears are shown in a separated state in FIG. 7 for clarity of the drawing). Either one or both of the speed change gear 49 and the speed change gear 420 are mounted on the main shaft 41 or the drive shaft 42 to freely spin until that gear is selected, at which time the selected gear is coupled to the corresponding shaft such that the gear and the shaft lock together for rotation. Therefore, transmission of rotation from the main shaft 41 to the drive shaft 42 is carried out by only the selected pair of the speed change gears.

A shift cam 421 performs the gear selection in which the selected pair of gears 49, 420 are coupled to the respective shafts. The shift cam 421 comprises a shift input shaft. The shift cam 421 also comprises a plurality of cam grooves 421a. Shift forks 422 are mounted such that they ride within the respective cam grooves 421a. The shift forks 422 are adapted to engage with predetermined ones of the speed change gears 49 and the speed change gears 420 of the main shaft 41 and the drive shaft 42. By rotating the shift cam 421, the shift forks 422 are moved in respective axial directions by being guided by the cam grooves 421a and only a pair of the speed change gear 49 and the speed change gear 420 at positions in accordance with a rotational angular position of the shift cam 421 are spline coupled to the main shaft 41 and the drive shaft 42. Thereby, the positions of the speed change gears are determined and transmission of rotation is carried out at a predetermined speed change ratio between the main shaft 41 and the drive shaft 42 through the selected speed change gears 49, 420.

The shift mechanism 43 reciprocates the shift rod 75 by driving the shift actuator 70 and rotates the shift cam 421 by a predetermined angle by way of a shift link mechanism 425. Thereby, the shift fork 422 is moved in the axial direction by a predetermined amount by following the cam groove 421*a* and pairs of the speed change gears 49, 420 are fixed to the main shaft 41 and the drive shaft 42. Thus, rotational drive force from the engine is transmitted to the wheel at a selected speed reduction ratio.

Figure 8:
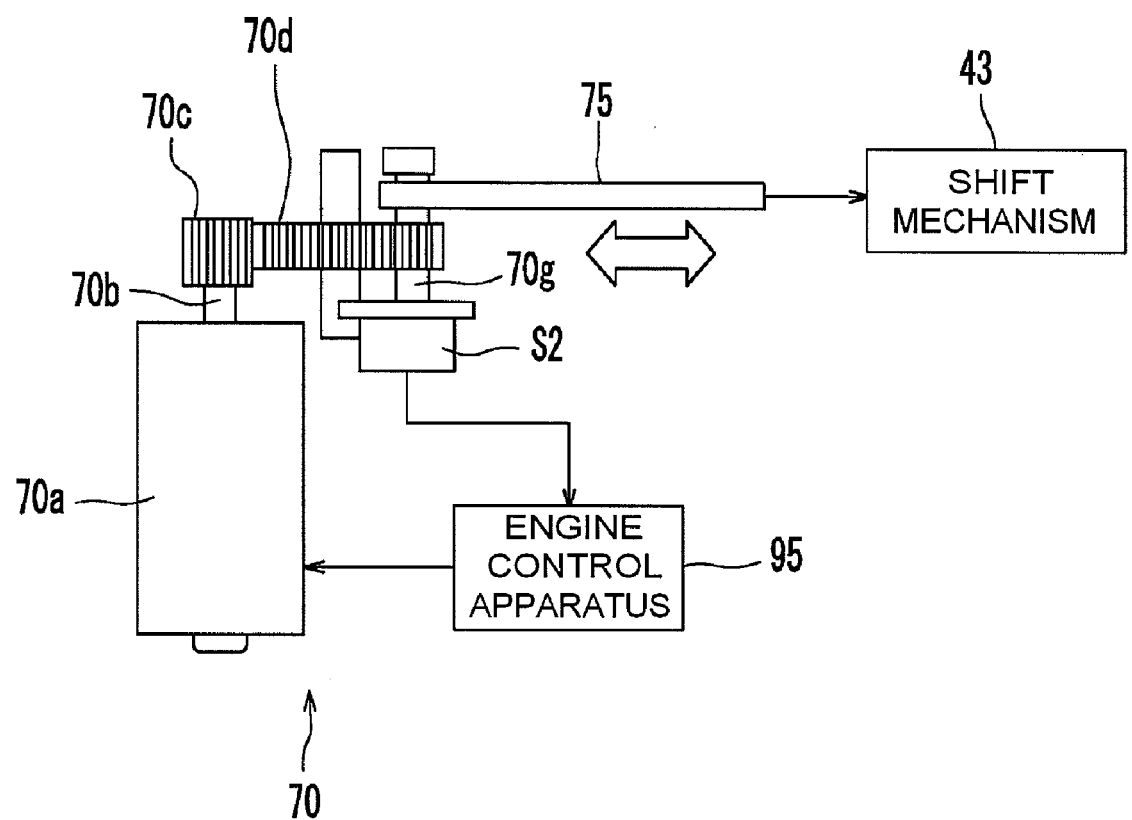
FIG. 8 is a schematic view of a shift actuator, a shift rod, and a shift mechanism of the automated transmission control device.

The shift actuator 70 may be a hydraulic type or may be an electric type. In the illustrated configuration, the shift actuator 70 comprises an electric motor. With reference to FIG. 8, the shift actuator 70, the shift rod 75 and the shift mechanism 43 are shown in a schematic drawing. As shown by FIG. 8, in the illustrated configuration, a motor shaft 70*b* of a shift motor 70*a* is rotated by a signal from the engine control apparatus 95, and a gear 70*c* that is mounted to the motor shaft 70*b* therefore is rotated. By rotating the gear 70*c*, a speed reduction gear 70*d*, which is engaged with the gear 70*c*, also rotates. The speed reduction gear 70*d* is coupled to a drive shaft 70*g*, which results in the drive shaft 70*g* also rotating when the motor shaft 70*b* rotates.

Figure 9:
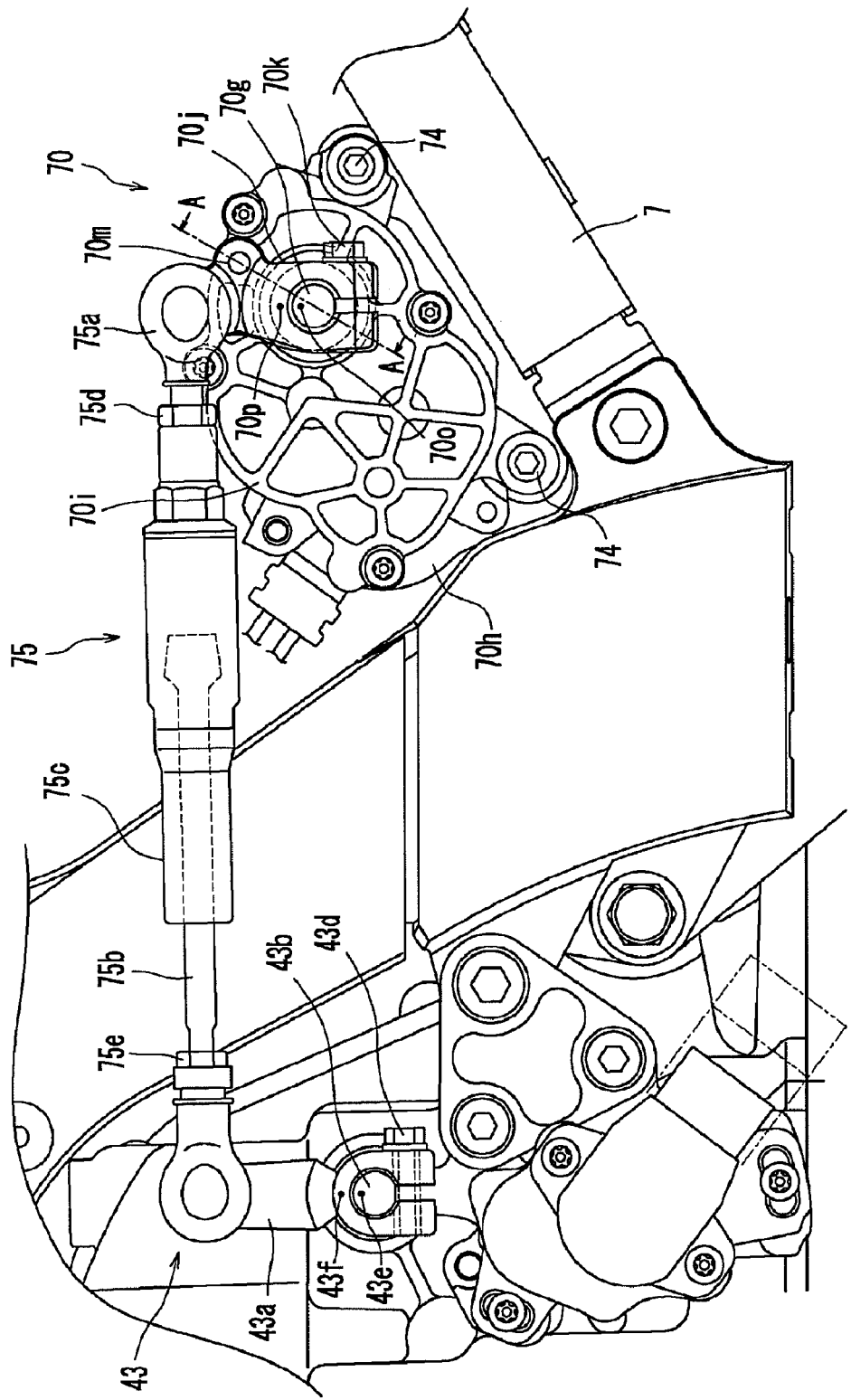
FIG. 9 is a side view of the shift actuator, the shift rod, and the shift mechanism.

FIG. 9 is a side view showing an embodiment of the shift actuator 70, the shift rod 75 and the shift mechanism 43. As shown in FIG. 9, a fastener 74, such as a bolt or the like, can be used to secure a housing 70*h* of the shift actuator 70, and in the particular illustrated configuration the attaching bracket 73 (see FIG. 2), to the back stay 7.

An operating lever 70*j* is coupled to the drive shaft 70*g* (also refer to FIG. 8). The operating lever 70*j* is connected with a shift actuator end of a connecting portion of the shift rod 75 (i.e., the right side in FIG. 9) by a bolt (not illustrated) or in any other suitable manner. The connecting portion of the shift rod 75 preferably is pivotable relative to the operating lever 70*j*. In other words, the angular orientation between the operating lever 70*j* and the shift rod 75 will change when the operating lever 70*j* rotates with rotation of the drive shaft 70*g*. In the preferred configuration, the operating lever 70*j* is fixed to the drive shaft 70*g* by a bolt 70*k* or the like such that the operating lever 70*j* is generally axially restrained relative to the drive shaft 70*g*.

The shift position detecting apparatus S2 preferably detects the position or rotation of the drive shaft 70*g* (see FIG. 8). In one configuration, the shift position detecting apparatus S2 can be arranged at an end portion (an end portion on a depth side of paper face of FIG. 9) of the drive shaft 70*g* and can be secured to the housing 70*h* by an attaching bolt (not illustrated). The position detecting apparatus S2 detects information from rotation of the drive shaft 70*g* and transmits the position information to the engine control apparatus 95. The engine control apparatus 95 controls the shift motor 70*a* based on the position information. Other suitable sensor configurations can also be used.

The shift rod also has a connecting portion located on the end closest to the shift mechanism 43. This connecting portion preferably is connected to a shift operating lever 43*a* of the shift mechanism 43 by a bolt or the like (not illustrated). This connecting portion of the shift rod 75 also preferably is pivotable relative to the shift operating lever 43*a*. Further, the shift operating lever 43*a* can be secured to a shift operating shaft 43*b* by a bolt 43*d* or the like. Thus, the shift operating lever 43*a* is generally restrained from axial movement relative to the shift operating shaft 43*b*.

Thus, the shift rod 75 and the shift operating lever 43*a* are coupled together for movement. The movement of the shift operating lever 43*a* is a pivoting movement about an axis defined by the shift operating shaft 43*b*. Preferably, the shift operating lever 43*a* is spline coupled to the shift operating shaft 43*b*. Therefore, the shift operating lever 43*a* and the shift operating shaft 43*b* rotate together.

The illustrated shift rod 75 preferably comprises a first rod portion 75*a* that is connected to the operating lever 70*j* and a second rod portion 75*b* that is connected to the shift operating lever 43*a*. In the illustrated configuration, a portion of the second rod portion 75*b* comprises a threaded region while a portion of the first rod portion 75*a* comprises a threaded hole. Thus, the second rod portion 75*b* can be threaded into the first rod portion 75*a*. It should be noted that either portion 75*a*, 75*b* can be externally threaded with the other portion having an internally threaded portion.

A length of the shift rod 75 can be changed by rotating the second rod portion 75*b* relative to the first rod portion 75*a* (or by rotating the first rod portion 75*a* relative to the second rod portion 75*b*). Further, a structure for changing the length of the shift rod 75 is not limited to that shown in FIG. 9 but various structures can be adopted. For instance, a coupling sleeve can be used such that both portions 75*a*, 75*b* have the same construction and the coupling sleeve joins the two portions.

In one preferred configuration, a fastening nut 75*d* is provided along a portion of the first rod portion 75*a*. By tightening the fastening nut 75*d*, the first rod portion 75*a* can be rotated and a relative rotational position of the first rod portion 75*a* can be fixed. Further, a fastening nut 75*e* can be provided along a portion of the second rod portion 75*b*. By tightening the fastening nut 75*d*, the second rod portion 75*b* can be prevented from being rotated and the rotational position of the second rod portion 75*b* can be fixed. Other constructions also can be used.

Figure 10:
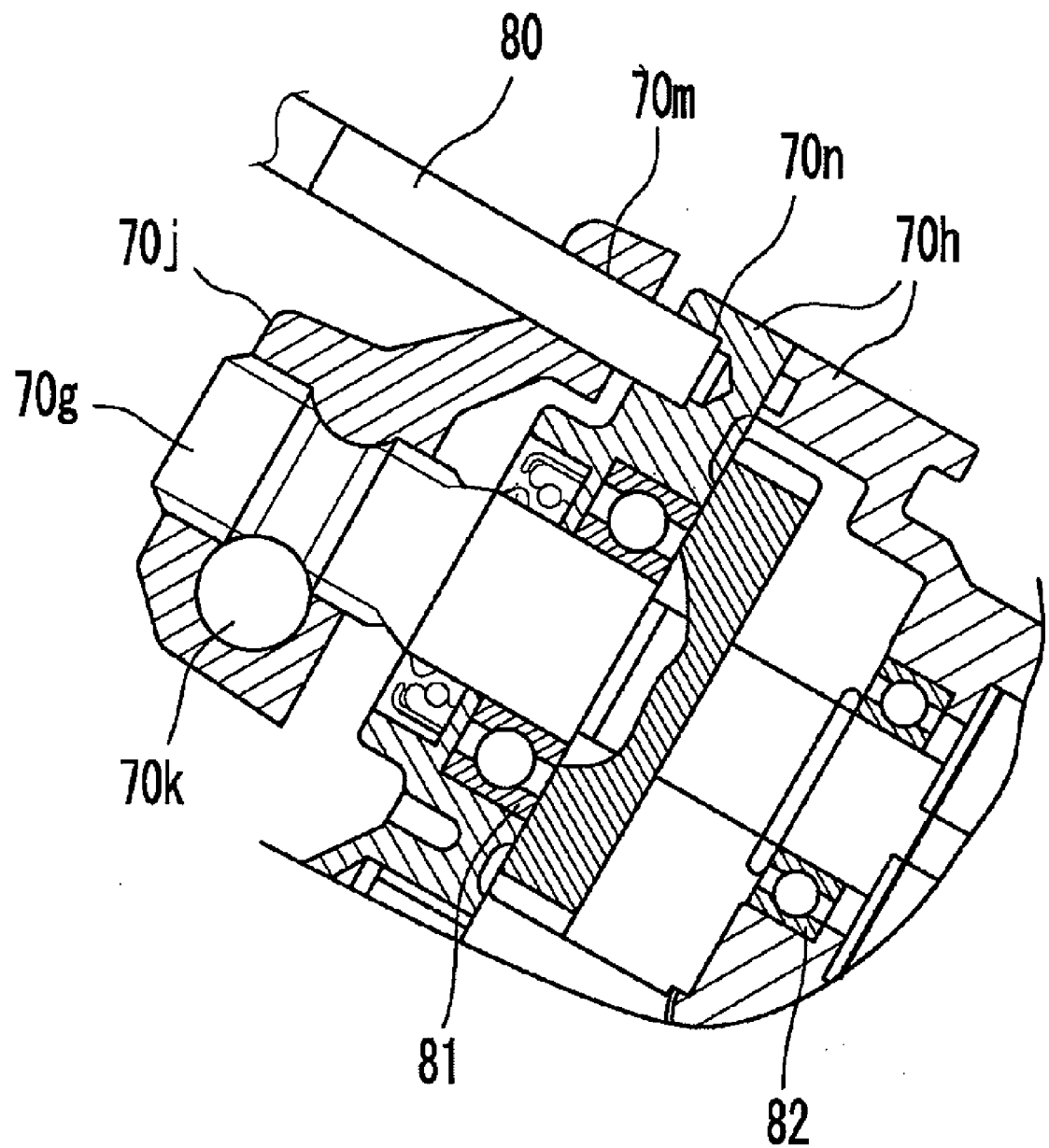
FIG. 10 is a sectioned view taken along a line A-A of FIG. 9.

FIG. 10 shows a sectional view taken along a line A-A of FIG. 9. As shown by FIG. 10, the operating lever 70*j* can be secured to the drive shaft 70*g* by the bolt 70*k* (see FIG. 9). The operating lever 70*j* can be generally axially fixed (i.e., secured in the left and right direction of FIG. 10) to the drive shaft 70*g*. The operating lever 70*j* can be pivoted with rotation of the drive shaft 70*g*. In the illustrated configuration, the drive shaft 70*g* is supported in the housing 70*h* by bearings 81, 82.

In the illustrated configuration, a through hole 70*m* is formed at an upper portion of the operating lever 70*j* (see also FIG. 9) and a bottomed hole 70*n* is formed at the housing 70*h*. Both of the holes 70*m*, 70*n*, which can be considered pin holes, preferably are generally cylindrical in shaft and both of the holes 70*m*, 70*n* preferably have substantially the same diameter.

FIG. 10 a lever positioning pin 80 that is inserted into the through hole 70*m* and the bottomed hole 70*n*. Further, FIG. 9 shows the lever positioning pin 80 not inserted into the holes 70*m*, 70*n*. As shown by FIG. 10, the lever positioning pin 80 can be inserted through the through hole 70*m* and into the bottomed hole 70*n*. Thereby, a position in a rotational direction of the operating lever 70*j* can be secured in a desired position. In other words, the through hole 70*m* and the bottomed hole 70*n* preferably are formed such that the operating lever 70*j* is arranged at a desired position when coupled with the lever positioning pin 80.

With reference to FIG. 9, an explanation will be given of a preferred procedure for attaching the shift actuator 70 during assembly or reassembly of the motorcycle 1. First, by using the bolt 70*k*, the operating lever 70*j* can be attached to the drive shaft 70*g*. At this time, the position of the operating lever 70*j* relative to the drive shaft 70*g* can be determined such that a punch mark 70*o* formed at a shaft end face of the drive shaft 70*g* and a punch mark 70*p* formed at the operating lever 70*j* coincide with each other. Other markings also can be used to provide the desired alignment. When the punch marks 70*o*, 70*p* coincide with each other, axis centers of the through hole 70*m* and the bottomed hole 70*n* (refer to FIG. 10) substantially coincide with each other and the lever positioning pin 80 can be inserted into the holes 70*m*, 70*n*.

When the operating lever 70*j* is attached and the lever positioning pin 80 is inserted through the through hole 70*m* and into the bottom hole 70*n*, the operating lever 70*j* is fixed to a reference position. Thus, calibration of the shift position detecting apparatus S2 (refer to FIG. 6) can be carried out. In other words, a desired position of the shift position detecting apparatus S2 can be determined such that a voltage value of the shift position detecting apparatus S2 becomes a predetermined value because the lever 70*j* is secured in the reference position. Further, when the position of the operating lever 70 is fixed by the lever positioning pin 80, the drive shaft 70*g* is unable to rotate substantially relative to the housing 70*h*.

When the desired position of the shift position detecting apparatus S2 is determined and the shift position detecting apparatus S2 is secured in position, such as by using the bolt 43*d*, the shift operating lever 43*a* is attached to the shift operating shaft 43*b*. At this time, the position of the shift operating lever 43*a* relative to the shift operating shaft 43*b* can be determined. Preferably, a punch mark 43*e* formed at a shaft end face of the shift operating shaft 43*b* and a punch mark 43*f* formed at the shift operating lever 43*a* coincide with each other. Other suitable markings can be used.

When the shift operating lever 43*a* is attached, the shift actuator 70 with the attached operating lever 70*j* is connected to the attaching bracket 73 (refer to FIG. 2), such as by using the bolt 74.

When the shift actuator 70 is attached to the attaching bracket 73, the shift rod 75 is attached to the operating lever 70*j*. In one configuration, the first rod portion 70*a* of the shift rod 75 and the operating lever 70*j* are coupled together, such as by a bolt or the like.

Preferably, although not illustrated, the first rod portion 75*a* of the shift rod 75 comprises a hole that receives the bolt. On the other hand, a nut portion provided with a screw hole can be formed at one end (i.e., the end portion on an opposite side relative to a side of fastening the bolt 70*k* and an upper end portion of FIG. 9) of the operating lever 70*j*. The hole of the first rod portion 75*a* and the screw hole of the operating lever 70*j* can be fitted with a bolt (not illustrated) from a surface side to a backside of paper face of FIG. 9. Thereby, the shift rod 75 is rotatably connected to the operating lever 70*j*.

After attaching the shift rod 75 to the operating lever 70*j* as described above, including inserting the lever positioning pin 80 to the through hole 70*m* and the bottomed hole 70*n*, the operating lever 70*j* is tacked to the reference position. The length of the shift rod 75 can be adjusted while the lever 70*j* is tacked in position.

In one configuration, which is not illustrated, the shift operating lever 43*a* can be provided with a nut portion similar to that of the operating lever 70*j*. The second rod portion 75*b* of the shift rod 75 also can be formed with a hole similar to that of the first rod portion 75*a*. Thus, the second rod portion 75*b* and the shift operating lever 43*a* can be secured by a bolt or the like (not illustrated).

Adjustment of the length of the shift rod 75 preferably results in the position of the hole of the second rod portion 75*b* and the position of the screw hole of the operating lever 43*a* to coincide with each other. Specifically, the length of the shift rod 75 is adjusted such that, when the attaching bolt is inserted into the hole of the second rod portion 75*b*, the attaching bolt can smoothly be inserted into the nut portion of the operating lever 43*a*. The second rod portion 75*b* preferably is pivotably connected to the shift operating lever 43*a*. Thereafter, the lever positioning pin 80 is withdrawn from the through hole 70*m* and the bottomed hole 70*n*, and the fastening nuts 75*d*, 75*e* can be fastened to thereby fix the length of the shift rod 75.

FIG. 9 shows the first rod portion 75*a* and the second rod portion 75*b* of the shift rod 75 being generally enclosed by a cover. Therefore, the respective holes of the first rod portion 75*a* and the second rod portion 75*b* are not illustrated.

In the above-described configuration, the operating lever 70*j* and the housing 70*h* are respectively formed holes 70*m*, 70*n* and, by inserting the lever positioning pin 80 through the holes 70*m*, 70*n*, the position of the operating lever 70*j* can be temporarily secured in a predetermined position. Therefore, during calibration of the shift actuator 70, the person carrying out the calibration does not need to manually secure the position of the operating lever 70*j*. Thus, convenience and certainty in calibration are improved.

By temporarily fixing or tacking the drive shaft 70*g*, the shift position detecting apparatus S2 can be secured to the housing 70*h* in a desired location and adjustment of the position of the shaft position detecting apparatus S2 can be more easily accomplished. Further, the position of the shift position detecting apparatus S2 can be adjusted by a single member of the shift actuator 70 and, therefore, ease of assembly is improved. Further, the length of the shaft rod 75 also can be adjusted while the drive shaft 70*g* is temporarily secured and, therefore, the adjusting operation can be simplified in comparison with the background art in which adjustment is carried out while looking at the output value of the shift position detecting apparatus S2. Further, adjusting the length of the shaft rod 75 can be carried out independently from the operation of adjusting the position of the shift position detecting apparatus S2 and, therefore, ease of assembly and ease of maintenance can be improved.

While an explanation has been given above in which the hole 70*m* extends through the operating lever 70*j*, the hole may be formed through other members keeping in mind the desire to temporarily secure the drive shaft 70*g* in position. For example, the through hole may be formed at the shift operating lever 43*a*. Further, for example, the through hole may be formed at both of the operating lever 70*j* and the shift operating lever 43*a*. Moreover, with regard to the bottomed hole, the position of forming the bottomed hole is not limited to the illustrated configuration. For example, the bottomed hole may be formed in the attaching plate 61 or the like. In some configurations, a special bracket can be provided in which the bottoming hole is formed.

In the illustrated configuration, the drive shaft 70*g* is directly supported by the housing 70*h* by way of the bearings 81, 82. In some configurations, the drive shaft 70*g* may not be directly supported by the housing 70*h* but may be supported thereby indirectly. Further, the position detecting apparatus S2 can be either directly or indirectly supported by the housing 70*h*. Although the length of the shift power transmitting mechanism may be adjusted by lengthening and shortening the shift power transmitting mechanism as in the illustrated configuration, any other suitable construction can be used to adjust the length thereof. For example, the length can be adjusted by altering the end points such that the angle connecting rod varies.

In the illustrated construction, the through hole 70*m* is formed at a location on the operating lever 70*j* that is disposed outside of the housing 70h. Further, the bottomed hole 70n is formed at an outer surface of the housing 70h. In this way, in the illustrated configuration, the through hole 70m and the bottomed hole 70n are formed on an outer side of the housing 70h and, therefore, the drive shaft 70g can easily be secured by the lever positioning pin 80.

While an explanation has been given in which a first supporting portion for supporting the lever positioning pin 80 as a fixing member is the bottomed hole 70n, according to the invention, the first supporting portion is not limited to the bottomed hole 70n. For example, the drive shaft 70g can be temporarily fixed to the housing 70h such that the drive shaft is unable to rotate by providing a projected portion formed at the housing 70h and fitting the projected portion with a fixing member. Further, the projected portion may be formed with a screw portion that is secured to the fixing member. Moreover, when a recess portion of the bottomed hole 70n or the like is adopted as the first supporting portion, a shape of the recess portion is not limited at all. The recess portion is not limited to a hole having a smooth inner peripheral face but may be a screw hole or the like. In some configurations, a slotted recess or the like can be used.

While the illustrated configuration features the through hole 70m as a second supporting portion that supports the lever positioning pin 80, the second supporting portion can have any other suitable configuration. Further, the through hole 70m can have any suitable configuration and is not limited to a generally cylindrical hole having a smooth inner peripheral face. In some configurations, the hole 70m can be a screw hole formed with internal threading. The shape of the through hole 70m can have any of a number of various shapes.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A method of assembling a vehicle, the vehicle comprising a shift mechanism, the shift mechanism comprising a plurality of gear combinations, a shift actuator comprising a drive shaft, a housing for rotatably supporting the drive shaft, and a position sensor supported by the housing, the position sensor being adapted to detect a rotational position of the drive shaft for driving the shift mechanism and the shift mechanism further comprising a shift power transmitting mechanism, the shift power transmitting mechanism adapted to connect the shift mechanism and the shift actuator, at least a portion of the shift power transmitting mechanism having an adjustable length, the method of assembling comprising:
fixing the drive shaft to the housing with a fixing member that secures the drive shaft to the housing at a location offset from an axis of the driveshaft such that the drive shaft is generally unable to rotate relative to the housing;
attaching the position sensor to the housing while the drive shaft is unable to rotate relative to the housing; and
adjusting the adjustable length of the portion of the shift power transmitting mechanism while the drive shaft is unable to rotate relative to the housing.

2. A vehicle comprising:
a shift mechanism comprising a plurality of speed change gear stages;
a shift actuator comprising a drive shaft, a housing rotatably supporting the drive shaft, and a position sensor supported by the housing, the position sensor being adapted to detect a rotational position of the drive shaft; and
a shift power transmitting mechanism connecting the shift mechanism and the shift actuator, a portion of the shift power transmitting mechanism having an adjustable length;
the housing comprising a first support portion that supports a fixing member, the first support portion being offset from an axis of the drive shaft, the fixing member being removably secured to the drive shaft such that the drive shaft is secured by the fixing member to the housing and such that the drive shaft is generally unable to rotate relative to the housing with the fixing member secured to the drive shaft.

3. The vehicle according to claim 2, further comprising a lever secured for rotation to the drive shaft, the lever comprising a second support portion that supports the fixing member.

4. The vehicle according to claim 3, wherein a portion of the drive shaft extends from the housing, the lever is attached to the portion of the drive shaft that extends from the housing such that at least a portion of the lever is disposed outside of the housing, the first support portion being formed at an outer surface of the housing, and the second support portion being formed at the portion of the lever disposed outside of the housing.

5. The vehicle according to claim 4, wherein the fixing member comprises a rod-like member, the first support portion comprises a recessed portion formed within the fixing member, and the second support portion comprises an opening through which the fixing member is inserted.

6. The vehicle according to claim 5, wherein the recessed portion comprises a bottomed hole and the opening comprises a through hole.

7. The vehicle according to claim 2, wherein the vehicle is a riding type vehicle.

8. A shift actuator comprising a drive shaft, a housing rotatably supporting the drive shaft, a position sensor supported by the housing, the position sensor being adapted to detect a rotational position of the drive shaft, the housing comprising a first support portion, the first support portion being offset from an axis of the drive shaft, the first support portion adapted to temporarily secure a fixing member, the fixing member securing the drive shaft to the housing such that the drive shaft is generally unable to rotate relative to the housing.

9. The shift actuator according to claim 8, further comprising a lever coupled for rotation with the drive shaft, wherein the lever comprises a second support portion, the second support portion and the first support portion being temporarily joined together such that the drive shaft is generally unable to rotate relative to the housing.

10. The shift actuator according to claim 9, wherein the first support portion and the second support portion can be joined together by a pin.

* * * * *

UNITED STATES PATENT AND TRADEMARK OFFICE
CERTIFICATE OF CORRECTION

PATENT NO. : 7,665,567 B2
APPLICATION NO. : 11/469252
DATED : February 23, 2010
INVENTOR(S) : Makoto Kosugi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 685 days.

Signed and Sealed this

Seventh Day of December, 2010

David J. Kappos
*Director of the United States Patent and Trademark Office*